Patented Dec. 9, 1947

2,432,207

UNITED STATES PATENT OFFICE 2,432,207

FUR CARROTING SOLUTION AND PROCESS

Michael Mulqueen, Walden, N. Y., assignor to Pellissier, Jonas & Rivet, Inc., Walden, N. Y., a corporation of New York No Drawing. Application December 23, 1942, Serial No. 469,927

8 Claims. (Cl. 8—112)

This invention relates to the carroting of fur and similar animal fibres to impart felting properties thereto.

In the carroting of furs, solutions of mercury salts have been used for many years. However, due to the toxic effects of the mercury, numerous proposals have been made to substitute other substances in carroting solutions. The problem is complicated by the fact that while various theories have been advanced in attempted explanation of the complicated reactions occurring in the carroting of furs, the reactions involved are complex and the theories have not progressed to such stage as to explain occurring phenomena with certainty.

An object of my invention is to provide a novel non-mercuric carroting solution capable of imparting desired felting properties to fur in a particularly effective and expeditious manner, and with a minimum of ingredients.

Prior to my invention a carroting solution containing chloric acid, nitric acid, sulphuric acid, and hydrogen peroxide was known, which solution has been used to a considerable extent. I have discovered not only that the chloric acid may be omitted, but that the resulting solution is capable of producing, with fewer ingredients, results superior to those attained by the above-mentioned prior art solution, as will be hereinafter more particularly noted.

I find that an aqueous solution of sulphuric acid, nitric acid, and hydrogen peroxide provides an especially efficient and advantageous carroting solution whereby desired felting qualities may be imparted to a wide variety of furs. The solution may be easily applied to the fur, since it flows freely and penetrates the fur easily. Furthermore, special care in applying my solution to the fur is unnecessary. Indeed, less solution is required to obtain a fast shrinking fur than with prior carrots of which I am aware. Stacking or piling of the fur is not necessary. The brittleness, charring, and gumming encountered with many prior art carrots, when fast drying is applied, are obviated.

Furthermore, with my carroting solution, the dried fur on the skin is found to be in especially good condition. The fur feels less sticky, in contrast to the carroted feel of fur treated with certain prior art solutions. Also, fur treated with my solution does not have the fibre brittleness evidenced in conjunction with fur carroted by other non-mercuric solutions on rubbing the fur side of the skins with the hand.

Furthermore, my solution is capable of imparting desired felting qualities to a particularly wide variety of furs. In addition to so-called "gray" furs, which represent the type most extensively utilized in the hat-making industry, my solution has produced excellent results in the carroting of "white" furs which are used in the manufacture of hats of pearl or light shades. It furthermore has been used successfully in the carroting of American and Canadian haresfur, which is of considerably greater density and fibre length than fur ordinarily carroted for hat manufacture.

The concentration and proportion of ingredients may of course vary within relatively wide limits depending upon the kind of fur, mode of operation, and results desired. There are many different kinds of fur within each of the general classes mentioned above. Optimum proportions and concentrations of the ingredients of my solution for particular kinds of fur are determined by test.

Satisfactory results have been obtained with the specific solutions to follow, it being understood that these are simply illustrative examples, and may vary widely in accordance with particular conditions. In each of said examples, the contents of the ingredients are given in grams per 100 cubic centimeters of solution.

| Example number | Sulphuric acid | Nitric acid | Hydrogen peroxide |
| --- | --- | --- | --- |
| 1 | 1.7 | 3.3 | 5 |
| 2 | 1.7 | 5 | 5 |
| 3 | 2.5 | 2.7 | 5 |
| 4 | .8 | 6.5 | 5 |
| 5 | 2.5 | 1.7 | 10 |
| 6 | 2.5 | 2.2 | 10 |
| 7 | 2.5 | 1.7 | 7.5 |
| 8 | 3.42 | 1.7 | 10 |
| 9 | .8 | 6.2 | 7.5 |
| 10 | 1.7 | 5 | 5 |
| 11 | 1.7 | 5 | 6 |

Of the foregoing specific examples, those numbered 1, 2, 3, and 4 have been used successfully for the carroting of gray furs, numbers 5, 6, 7, and 8 for white furs, and numbers 9, 10, and 11 for domestic and Canadian haresfur.

My carroting solutions may be applied to the fur in any known manner, such as by brush, my immersion, or by mechanical applying means.

Upon the basis of the solutions which I have found satisfactory in practice, the lower limit of the sulphuric acid content may be about .5 gram per 100 cubic centimeters of solution; except that, for white furs, I find that the sulphuric acid content should be no lower than about 2 grams per 100 cubic centimeters for good results. The nitric acid content preferably should be no lower than about 1 gram per 100 cubic centimeters of solution. The lower limit of the hydrogen peroxide content may be about 2 grams per 100 cubic centimeters of solution; except that, for white furs, I have found that less than about 7.5 grams of hydrogen peroxide per 100 cubic centimeters is not as satisfactory as a higher hydrogen peroxide content.

Tests with my carroting solutions have furthermore produced satisfactory results with a sulphuric acid content as high as about 5 grams per hundred cubic centimeters of solution. It is preferable, however, that with this sulphuric acid content, the drying temperature should not exceed about 130° F., to avoid the possibility of gumminess. Still higher concentrations of sulphuric acid may be used provided care in drying be exercised to prevent too rapid concentration of this non-volatile acid on the fibre.

The nitric acid content, for white furs, should preferably not exceed about 2.5 grams per 100 cubic centimeters of solution. Higher nitric acid concentrations are found prone to cause too much discoloration of the fibres to enable them to be used as a white fur. In the case of gray fur, however, substantially higher nitric acid contents may be employed, and I have used around 7 grams of nitric acid per 100 cubic centimeters of solution with good results.

While in the examples hereinbefore specified, the hydrogen peroxide content for gray furs is substantially below that for white furs, I wish to note that the temperatures used in drying the gray furs were somewhat higher than those (about 120°–130°) usually employed in drying the white furs. With lower drying temperatures, the hydrogen peroxide content may be increased. Said content should, however, not be so high as to damage the fur under the drying temperature employed.

The foregoing observations and examples regarding concentrations and proportions of ingredients are based upon tests in which the solutions were applied to the pelts by brushing into the fur. When mechanical applying means are utilized, the concentrations and proportions may be further varied. For instance, substantially higher concentrations of ingredients than any of those above specified may be employed when the solution is applied evenly in thin films on the fibres, as may be accomplished by certain mechanical applying means known in the art. In other words, higher concentrations applied evenly in thin films on the fur fibres may obtain the same results as lower concentrations applied in heavier films. And when heat is applied to the fur concurrently with the mechanical application of the carroting solution thereto, the concentrations of solutions may be further increased, if desired.

Of course, where the solution is to be applied to the fur by brushing, the solution may, if desired, be initially prepared in a form more concentrated than that in which it is brushed into the fur, and later diluted to the desired concentration.

While as previously noted, the chemical reactions involved in the carroting of furs are highly complex and little understood, sulphuric and nitric acids are generally regarded primarily as hydrolyzing agents in their action on fur, although they act to some extent also as oxidizing agents. The nitric acid is usually regarded as having a greater oxidizing effect than the sulphuric acid. There may be substituted for the sulphuric acid in my solution another hydrolyzing acid, such as phosphoric acid ($H_3PO_4$), which is not volatile at the temperature of drying the carroted fur and which within the range of temperatures experienced is not consumed by oxidation reactions with the fur.

I find that good results are obtained when phosphoric acid is substituted for sulphuric acid on a direct substitution basis (or with a slightly higher percentage of phosphoric acid) for gray furs and for American and Canadian hareskins. For white furs, however, it is preferable that the phosphoric acid content be substantially increased. Examples of satisfactory carroting solutions, including phosphoric acid, nitric acid, and hydrogen peroxide are as follows (the contents specified being in grams per 100 cubic centimeters of solution):

| Example No. | Phosphoric acid | Nitric acid | Hydrogen peroxide |
| --- | --- | --- | --- |
| 12 | 6 | 1.7 | 10 |
| 13 | 5 | 1.7 | 10 |
| 14 | 5 | 1 | 10 |
| 15 | 1.7 | 3.2 | 5 |
| 16 | 1 | 6.2 | 5 |
| 17 | 4 | 4 | 5 |
| 18 | 1 | 6.2 | 7.5 |
| 19 | 3 | 4 | 7.5 |
| 20 | 2 | 5 | 7.5 |

Examples numbered 12, 13, and 14 were used successfully in carroting white furs; 15, 16, and 17 in carroting gray furs; and 18, 19, and 20 in carroting hareskins. These examples are simply illustrative. The proportions and concentrations of ingredients may be widely varied depending upon mode of application of the solution, kind of fur, and results desired.

If desired, dyes may be included in the solution for the carroting of white furs. For example, I have obtained satisfactory results with the inclusion of .025 grams of alizarine dye per 100 cubic centimeters of a solution containing sulphuric acid, nitric acid, and hydrogen peroxide. When phosphoric acid is substituted for sulphuric acid, however, in a solution for carroting white fur, I find that the dye content should preferably be reduced if increased carroting speed is desired. The dye may, if desired, be eliminated entirely.

My carroting solution may be readily applied to the fur in the usual way, as by brushing the solution into the fur while the latter is still on the skin, by spraying the solution on to the fur, by immersing the fur in the solution after the fur has been cut from the skin, or in any other known manner. The fur treated with my solution may be dried in accordance with usual practice; although, as previously noted, the piling or stacking of fur treated with my solution is not necessary.

Various prior art carroting solutions have relied upon the inclusion of metallic salts for the attainment of the carroting action. Others have found it advisable to include so-called "pigment protecting agents," of non-dyeing character in the presence of the other ingredients, to reduce impairment of fiber strength and avoid undesirable discoloration. The inclusion of so-called "inhibitors" for checking excessive carroting action in wetting and drying of the fur has also been proposed. In my carroting solutions, however, the inclusion of metallic salts is not only unnecessary, but the omission of such salts results in greater stability of solution. Furthermore, through the use of my solutions, the furs are effectively and expeditiously carroted without the need of including so-called pigment-protecting agents and also without the necessity of including carroting inhibitors.

I claim:

1. An aqueous carroting solution for treating furs, said solution containing as active carroting ingredients sulphuric acid, nitric acid, and hydrogen peroxide, and being substantially free from metallic salts as well as from chloric acids.

2. An aqueous carroting solution for treating furs, said solution comprising nitric acid, hydrogen peroxide, and a hydrolyzing acid of the class consisting of sulphuric acid and phosphoric acid, said solution being substantially free from chloric acids as well as from metallic salts, the above-specified ingredients being present in amounts not less than about the following in grams per hundred cubic centimeters of solution: nitric acid 1, hydrogen peroxide 2, and hydrolyzing acid .5.

3. An aqueous carroting solution for treating fur, said solution comprising sulphuric acid, nitric acid, and hydrogen peroxide, and being substantially free from chloric acids as well as from metallic salts, the above specified ingredients being present in amounts not less than about the following in grams per hundred cubic centimeters of solution: nitric acid 1, hydrogen peroxide 2, and sulphuric acid .5.

4. The method of preparing gray fur for felting which comprises treating the fibers with an aqueous carroting solution containing nitric acid, hydrogen peroxide, and a hydrolyzing acid of the class consisting of sulphuric acid and phosphoric acid, said solution being substantially free from chloric acids as well as from metallic salts, the above specified ingredients being present in amounts not less than about the following in grams per hundred cubic centimeters of solution: nitric acid 1, hydrogen peroxide 2, and hydrolyzing acid .5.

5. The method of preparing white fur for felting which comprises treating the fibers with an aqueous carroting solution containing nitric acid, hydrogen peroxide, and a hydrolyzing acid of the class consisting of sulphuric acid and phosphoric acid, said solution being substantially free from chloric acids, the above-specified ingredients being present in amounts not less than about the following in grams per hundred cubic centimeters of solution: nitric acid 1, hydrogen peroxide 7.5, and hydrolyzing acid 2; and said nitric acid content being not in excess of about 2.5 grams per 100 cubic centimeters of solution.

6. The method of preparing white fur for felting which comprises treating the fibers with an aqueous carroting solution containing nitric acid, hydrogen peroxide, and sulphuric acid, said solution being substantially free from chloric acids, the above-specified ingredients being present in amounts not less than about the following in grams per hundred cubic centimeters of solution: nitric acid 1, hydrogen peroxide 7.5, and sulphuric acid 2; and said nitric acid content being not in excess of about 2.5 grams per 100 cubic centimeters of solution.

7. The method of preparing white fur for felting which comprises treating the fibers with an aqueous carroting solution containing nitric acid, hydrogen peroxide, and phosphoric acid, said solution being substantially free from chloric acids, the above-specified ingredients being present in amounts not less than about the following in grams per hundred cubic centimeters of solution: nitric acid 1, hydrogen peroxide 7.5, and phosphoric acid 5; and said nitric acid content being not in excess of about 2.5 grams per 100 cubic centimeters of solution.

8. An aqueous carroting solution for treating furs, said solution consisting of nitric acid, hydrogen peroxide, and a hydrolyzing acid of the class consisting of sulphuric acid and phosphoric acid, said ingredients being present in amounts not less than about the following in grams per hundred cubic centimeters of solution: nitric acid 1, hydrogen peroxide 2, and hydrolyzing acid .5.

MICHAEL MULQUEEN.

REFERENCES CITED

The following references are of record in the file of this patent:

UNITED STATES PATENTS

| Number | Name | Date |
|---|---|---|
| 1,885,888 | Beal | Nov. 1, 1932 |
| 2,070,927 | Sartakoff | Feb. 16, 1937 |
| 2,169,997 | Fabian | Aug. 22, 1939 |
| 108,018 | Australian | July 27, 1939 |
| 2,048,645 | Fabian | July 21, 1936 |
| 2,330,813 | Donner | Oct. 5, 1943 |
| 2,356,681 | Mercier | Aug. 22, 1944 |
| 1,885,887 | Beal | Nov. 1, 1932 |
| 2,144,487 | Fabian | Jan. 17, 1939 |
| 2,309,254 | Page | Jan. 26, 1943 |